(12) United States Patent
Lee

(10) Patent No.: US 7,181,800 B2
(45) Date of Patent: Feb. 27, 2007

(54) DUSTER USING TO CLEAN CAR EXTERIOR

(76) Inventor: Pil-Hee Lee, 48-4 Naechu-Ri, Buki-Myun, Chongwon-Goon, Chungcheongbuk-Do (KR) 363-922

( * ) Notice: Subject to any disclaimer, the term of this patent is extended or adjusted under 35 U.S.C. 154(b) by 359 days.

(21) Appl. No.: 10/715,026

(22) Filed: Nov. 17, 2003

(65) Prior Publication Data
US 2004/0194245 A1  Oct. 7, 2004

(30) Foreign Application Priority Data
Apr. 7, 2003   (KR) .................. 20-2003-0010467

(51) Int. Cl.
*A47L 13/20* (2006.01)

(52) U.S. Cl. .................. 15/229.4; 15/229.1; 15/210.1; 15/147.1

(58) Field of Classification Search ............... 15/229.4, 15/229.8, 229.1, 209.1, 210.1, 147.1, 146; 209/215
See application file for complete search history.

(56) References Cited
U.S. PATENT DOCUMENTS
2,634,444 A * 4/1953 Coleman .................. 15/220.2
2,934,779 A * 5/1960 Wollner ....................... 15/246
5,395,148 A * 3/1995 Jameson et al. ........... 294/65.5

* cited by examiner

*Primary Examiner*—Gladys JP Corcoran
*Assistant Examiner*—Laura C Guidotti
(74) *Attorney, Agent, or Firm*—IPLA P.A.; James E. Bame

(57) ABSTRACT

The present invention relates to a duster for use in a vehicle for cleaning the exterior of the vehicle. More particularly, the present invention relates to a duster for use in a vehicle that can maximize cleaning efficiency with a small force since the duster is closely adhered to the exterior of the vehicle by means of magnetic force. The duster for use in a vehicle having a frame into which a sack-shaped dust cloth is inserted and a handle formed to extend toward one side of the frame includes an insertion groove formed in the bottom of the frame, wherein the magnetic sheet having magnetism is inserted into the insertion groove so that the magnetic sheet forms a flat surface along with the bottom of the frame. Therefore, the duster is closely adhered to the exterior of the vehicle by means of magnetism. It is thus easy to use the duster. It is also possible to finely clean all the portions of the vehicle including a high portion of the vehicle, semi-permanently maximize cleaning efficiency with a little force since there is not change in magnetism, and prevent in advance any damage due to miss of the duster during cleaning.

3 Claims, 6 Drawing Sheets

DUSTER USING TO CLEAN CAR EXTERIOR

BACKGROUND OF THE INVENTION

1. Field of the Invention

The present invention relates to a duster for use in a vehicle for cleaning the exterior of the vehicle, and more particularly, to a duster for use in a vehicle that can maximize a cleaning effect with a small force since the duster is closely adhered to the exterior of the vehicle by means of magnetic force.

2. Description of the Related Art

FIG. 7 is a perspective view showing a conventional duster.

The prior art duster includes a frame 200 into which a sack-shaped dust cloth is inserted and a handle 300 formed to extend toward one side of the frame 200. A user cleans the exterior of the vehicle with the handle 300 held by the hand.

In the duster constructed above, however, the user must press the frame artificially so that the sack-shaped dust cloth is adhered to the exterior of the vehicle for a fine cleaning. For this reason, it is inconvenient to use since greater force is used.

Further, the user's hands do not reach an upper part of the vehicle. For this reason, the user could not clean the upper part of the vehicle cleanly since he or she could not exert greater force artificially due to its height. In addition, as the user must exert the force in an uncomfortable posture, lots of force is needed and there is a possibility that the user may be damaged.

In addition, as the duster is not consistently and constantly adhered to the exterior of the vehicle when cleaning the vehicle, the cleaning is not carried out finely and uniformly.

Accordingly, there are problems that lots of time and force are consumed since more frequent and repetitive cleanings are needed.

SUMMARY OF THE INVENTION

The present invention is contrived to solve the aforementioned problems. An object of the present invention is to provide a duster for use in a vehicle that can maximize a cleaning effect with a small force since the duster is closely adhered to the exterior of the vehicle by means of magnetic force.

Another object of the present invention is to provide a duster for use in a vehicle that allows a user to selectively adjust close adherence by magnetism, if necessary, by inserting into/drawing out a magnetic sheet into/from a frame.

Still another object of the present invention is to provide a duster for use in a vehicle that allows a user to adequately adjust magnetism by attaching and detaching magnetic sheets, if needed.

According to one aspect of the present invention for achieving the object, there is provided a duster for use in a vehicle having a frame into which a sack-shaped dust cloth is inserted and a handle formed to extend toward one side of the frame, including a magnetic sheet having magnetism and provided in the frame, wherein the frame is closely adhered to the exterior of the vehicle by means of magnetism.

In the above, the duster further comprises an insertion groove formed in the bottom of the frame, wherein the magnetic sheet having magnetism is inserted into the insertion groove so that the magnetic sheet forms a flat surface along with the bottom of the frame.

The frame and the handle are integrally formed of a synthetic resin material and the magnetic sheet is insert-molded into the frame.

Further, the duster further comprises a receiving-space element having an opening that is formed within the frame in the longitudinal direction, so that the magnetic sheet is selectively received into the receiving-space element; and an open/close plug detachably attached to the opening.

Furthermore, the magnetic sheet is divided to form small-sized magnetic sheets, and wherein the duster further comprises a number of receiving grooves into which the small-sized magnetic sheets are selectively received, wherein the receiving grooves are separated by diaphragms and are formed in the bottom of the frame; sliding grooves formed at both lower sides of the receiving grooves; and a cover having sliding jaws inserted into sliding grooves is inserted into the frame to shuts tightly the receiving groove.

In addition, the magnetic sheet is divided in plural to form circular magnetic sheets, and wherein the duster further comprises a number of circular grooves whose inner circumference has spiral grooves, respectively, wherein the circular grooves are formed at a lower part of the frame so that they are selectively contained within the circular grooves; and circular caps each having a spiral groove at its outer circumference, being screwed with the circular groove, and having a grasp groove at its one side.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

The present invention will now be described in detail in connection with preferred embodiments with reference to the accompanying drawings.

Figure 1:
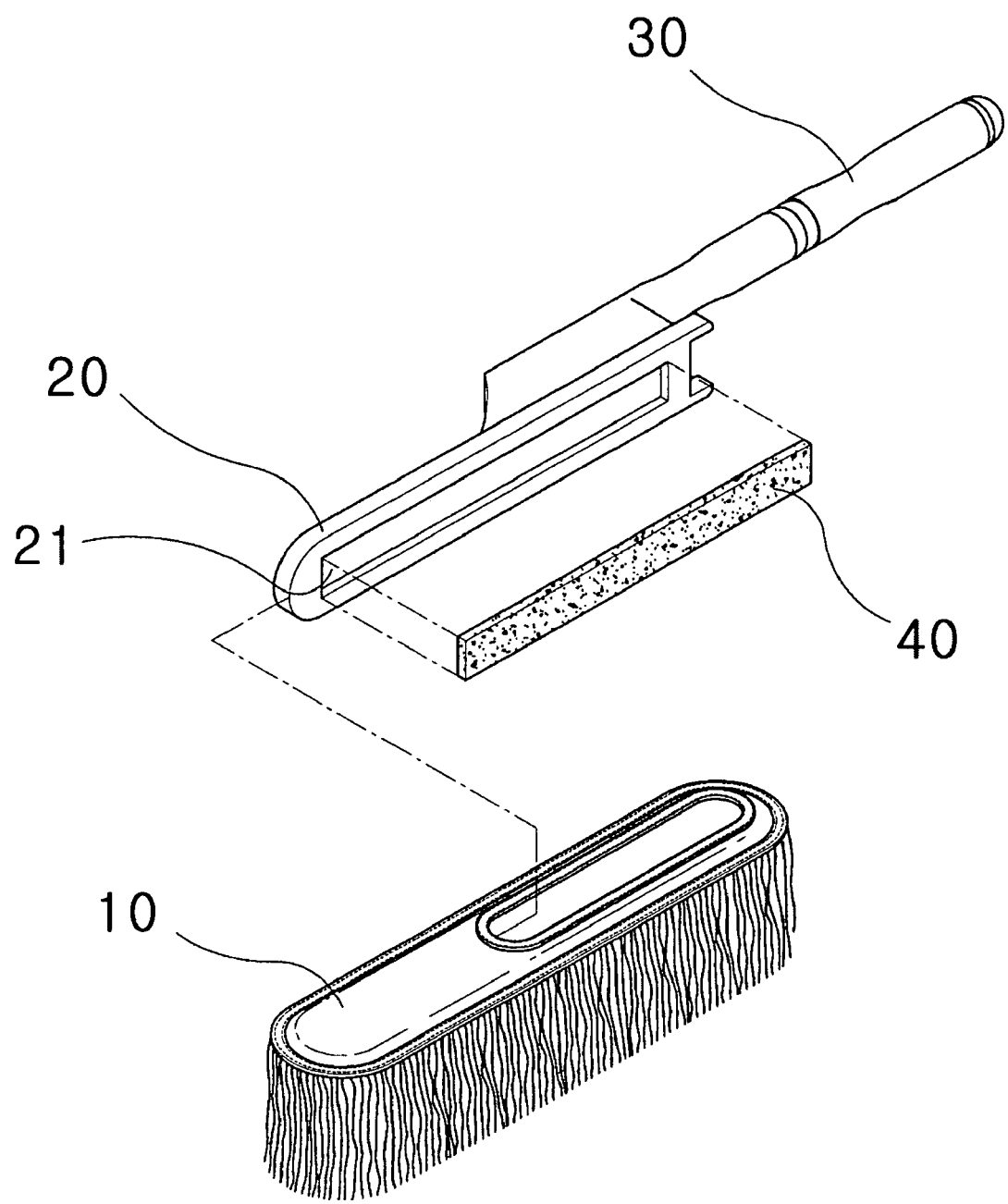
FIG. 1 is a dismantled perspective view illustrating a duster according to the present invention.

FIG. 1 is a dismantled perspective view illustrating a duster according to the present invention.

The duster of the present invention includes a frame 20 into which a sack-shaped dust cloth 10 is inserted, a handle 30 integrally formed toward the rear of the frame 20, an insertion groove 21 formed below the handle 30, and a magnetic sheet 40 inserted into the insertion groove 21.

In the above, the duster of the present invention is adhered to the exterior of the vehicle made of a metal by means of magnetic force of the magnetic sheet 40 having magnetism that is seated into the insertion groove 21. Therefore, a user can easily clean the exterior of the vehicle without the necessity to press forcibly the duster onto the exterior of the vehicle.

Further, it is preferred that the bottom of the frame 20 and the bottom of the magnetic sheet 40 inserted into the frame 20 form a flat surface. This enables the bottom of the frame 20 to closely touch and slide down the exterior of the vehicle.

It is also preferable that the frame 20 is integrally made from a synthetic resin material so that the insertion groove 21 is easily formed therein and the handle 30 can be attached thereto.

Therefore, as the duster of the present invention is smoothly adhered to the exterior of the vehicle by means of magnetic force by the magnetic sheet 40, it allows the user to easily clean the vehicle and to keep the duster.

Figure 2:
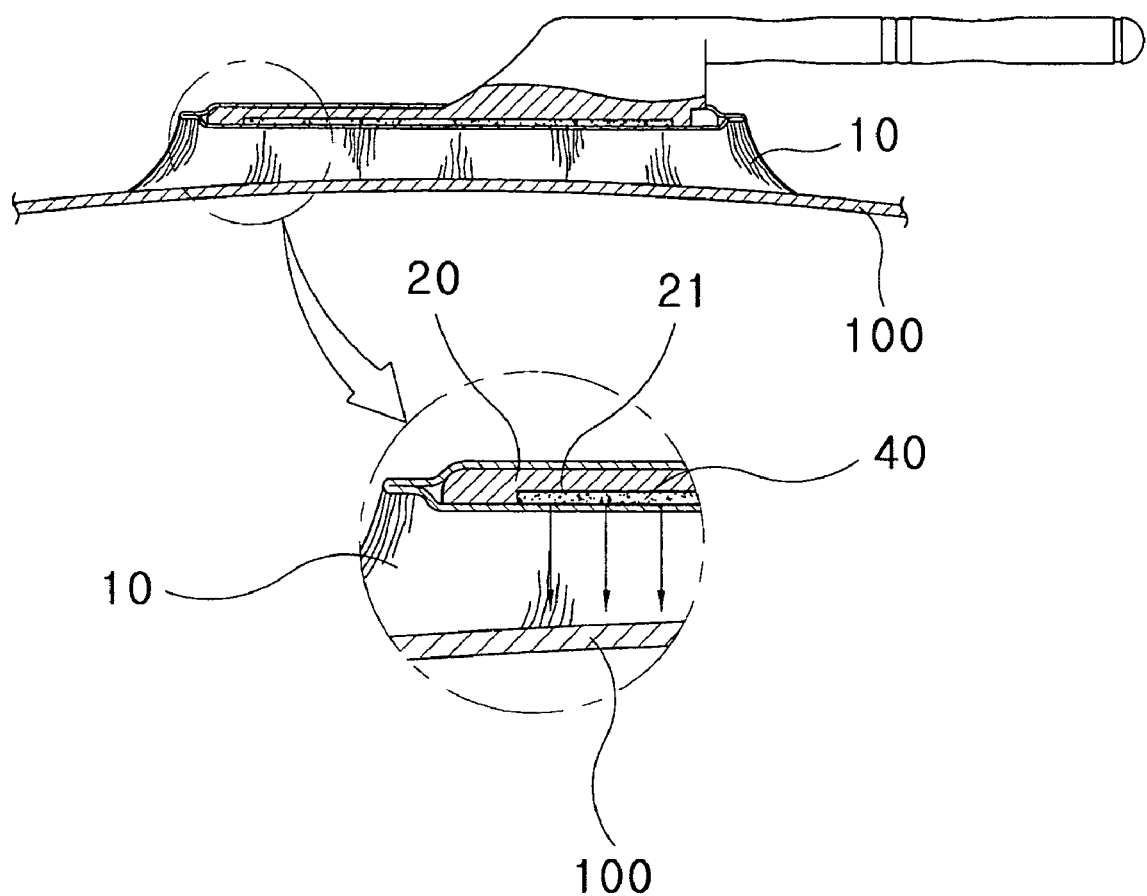
FIG. 2 is a partial cross-sectional view illustrating a duster after it is used according to the present invention.

FIG. 2 is a partial cross-sectional view illustrating a duster after it is used according to the present invention. FIG. 2 shows a state that the exterior of the vehicle 100 is cleaned by the duster of the present invention.

When the exterior of the vehicle 100 is cleaned by the duster of the present invention, magnetism takes place by which the frame 20 is about to be adhered to the exterior of the vehicle 100 by means of magnetic force of the magnetic sheet 40 attached to the insertion groove 21 of the frame 20. The sack-shaped dust cloth 10 provided between the frame 20 and the exterior of the vehicle 100 is naturally closely adhered to the exterior of the vehicle 100 by means of the magnetism.

As the sack-shaped dust cloth 10 is closely adhered to the exterior of the vehicle 100, the duster is naturally pressed onto the exterior of the vehicle 100 without applying additional pressure by the user.

As such, in a state that the sack-shaped dust cloth 10 is naturally closely adhered to the exterior of the vehicle 100 by means of the magnetism, if the user pushes the duster right and left, he or she can effectively clean the vehicle with a small force.

As a modified embodiment, a duster according to a first embodiment of the present invention will now be described with reference to FIG. 3, which is a partial sectional view of the duster.

Figure 3:
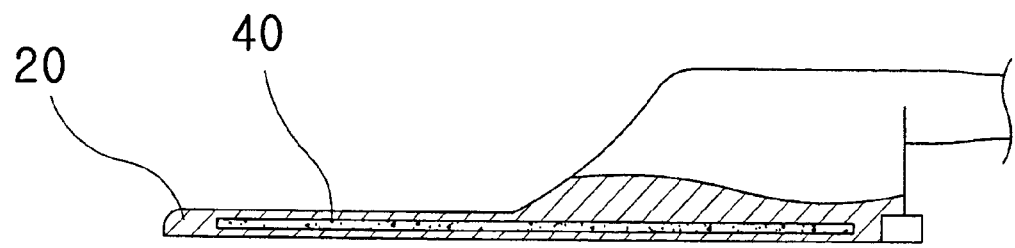
FIG. 3 is a partial sectional view illustrating a duster according to a first embodiment of the present invention.

As can be seen from FIG. 3, the magnetic sheet 40 is inject-molded into the frame 20 when the frame 20 and the handle 30 are integrally formed.

As the magnetic sheet 40 is inject-molded into the frame 20, the magnetic sheet 40 is firmly seated into the frame 20 while preventing breakage or damage of the magnetic sheet 40. Accordingly, the lifetime of the duster can be significantly extended.

As another embodiment, a duster according to a second embodiment of the present invention will now be described with reference to FIG. 4, which is a partial sectional view of the duster.

Figure 4:
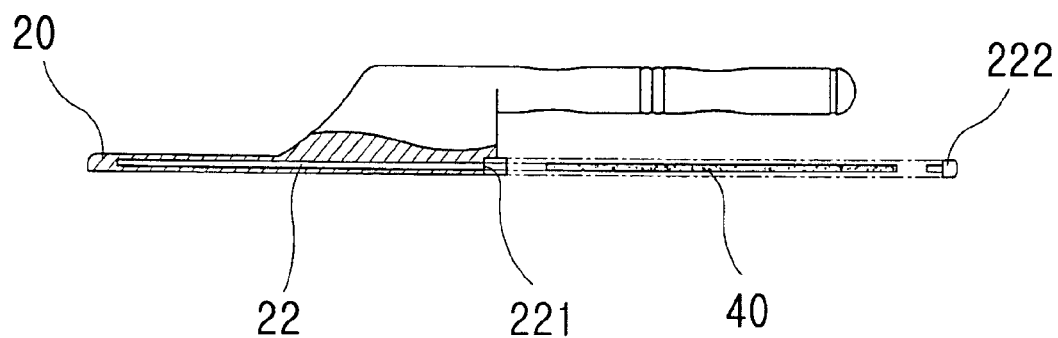
FIG. 4 is a partial sectional view illustrating a duster according to a second embodiment of the present invention.

From FIG. 4, it can be seen that the duster includes a receiving-space element 22 having an opening 221 formed within the frame 20 in the longitudinal direction. The magnetic sheet 40 is inserted into the receiving-space element 22. An open/close plug 222 is detachably attached to the opening 221.

In the above, the receiving-space element 22 is a space for receiving the magnetic sheet 40 inserted into the frame 20. A user can use the duster selectively by inserting or drawing out the magnetic sheet 40 into or from the frame 20, if necessary.

Furthermore, the opening 221 serves as an exit through which the magnetic sheet 40 is inserted into and drawn out from the receiving-space element 22. The open/close plug 222 functions to shut tightly the opening 221.

Therefore, according to the present duster, if it is required to closely adhere the duster to the exterior of the vehicle since there are lots of dusts, the magnetic sheet 40 is inserted into the receiving-space element 22 so that the duster can be closely adhered to the exterior of the vehicle due to magnetism. Meanwhile, if close adherence is not required since dust is a little, the magnetic sheet 40 is drawn out from the receiving-space element 22 so that close adherence does not occur due to magnetism. Therefore, the user can selectively use magnetism, if necessary.

As still another embodiment, a duster according to a third embodiment of the present invention will now be described with reference to FIG. 5, which is a dismantled perspective view of the duster.

Figure 5:
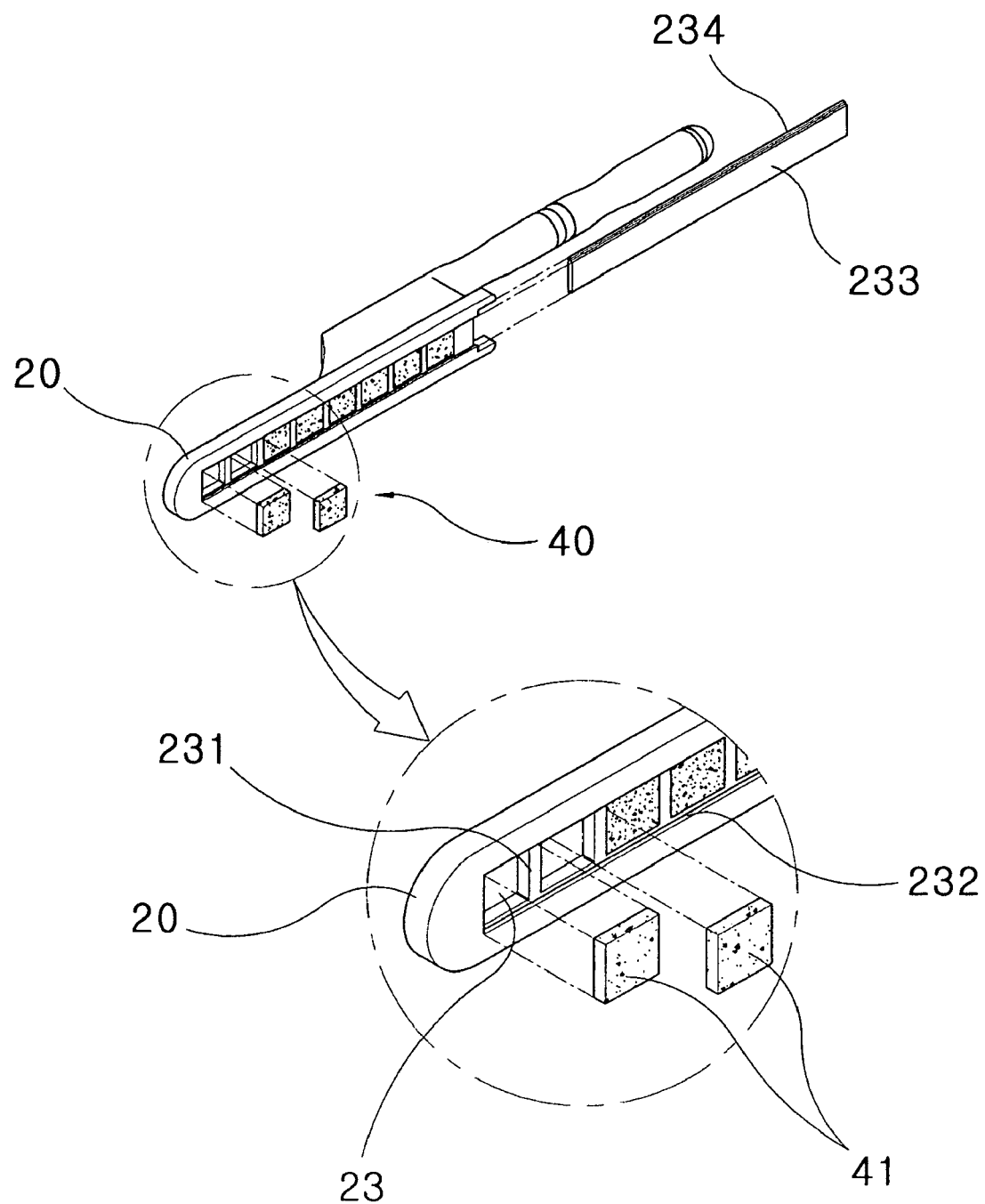
FIG. 5 is a dismantled perspective view illustrating a duster according to a third embodiment of the present invention.

In the duster shown in FIG. 5, a number of receiving grooves 23 separated by diaphragms 231 are formed in the bottom of the frame 20. Sliding grooves 232 are formed at both lower sides of the receiving grooves 23. A cover 233 having sliding jaws 234 at its both sides shuts tightly the receiving groove 23. At this time, the sliding jaws 234 are inserted into the sliding grooves 232. Small-sized magnetic sheets 41 are inserted into the receiving grooves 23. At this time, a magnetic sheet 40 is divided to form the small-sized magnetic sheets 41.

With the structure, the user can control the strength of magnetism by the small-sized magnetic sheets 41 by selectively inserting the small-sized magnetic sheets 41 into the plurality of the receiving grooves 23.

In other words, depending on the degree of dust settled on the vehicle such as when strong close adherence is not required, weak close adherence is needed, close adherence is not needed, or the like, the user can control the strength of magnetism by adjusting the number of the small-sized magnetic sheets 41 inserted into the receiving grooves 23.

In addition, the sliding jaws 234 formed at both sides of the cover 233 are inserted into the sliding grooves 232, so that the cover 233 is detachably seated onto the lower part of the frame 20. The small-sized magnetic sheets 41 can be accordingly adequately received or drawn out while the receiving grooves 23 are opened/closed.

As described above, the present duster has a simple structure and can be selectively controlled in its strength by the user so that the duster is adequately adhered to eh vehicle depending on the degree of dust.

As still another embodiment, a duster according to a fourth embodiment of the present invention will now be described with reference to FIG. 6, which is a dismantled perspective view of the duster.

Figure 6:
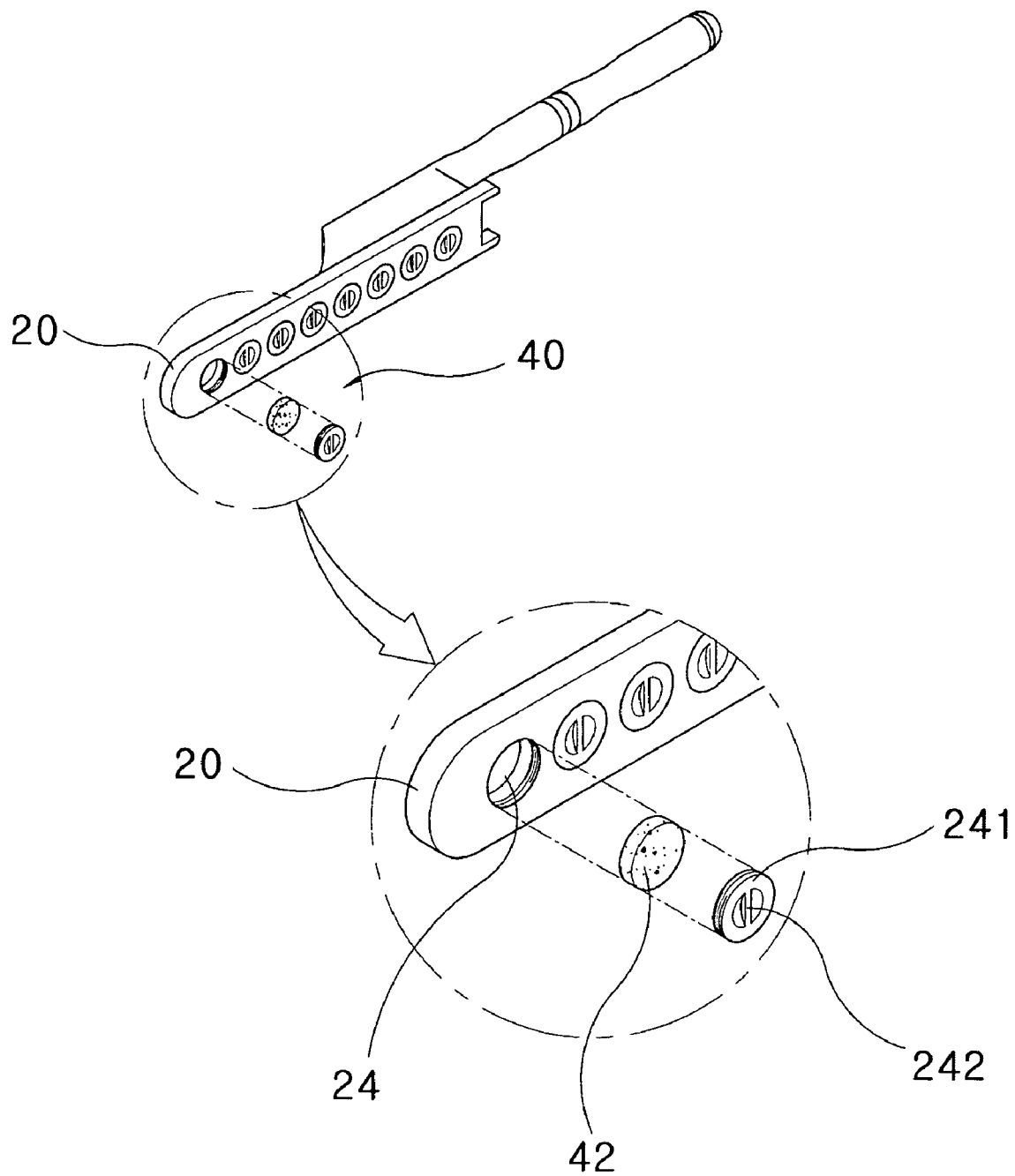
FIG. 6 is a dismantled perspective view illustrating a duster according to a fourth embodiment of the present invention.
Figure 7:
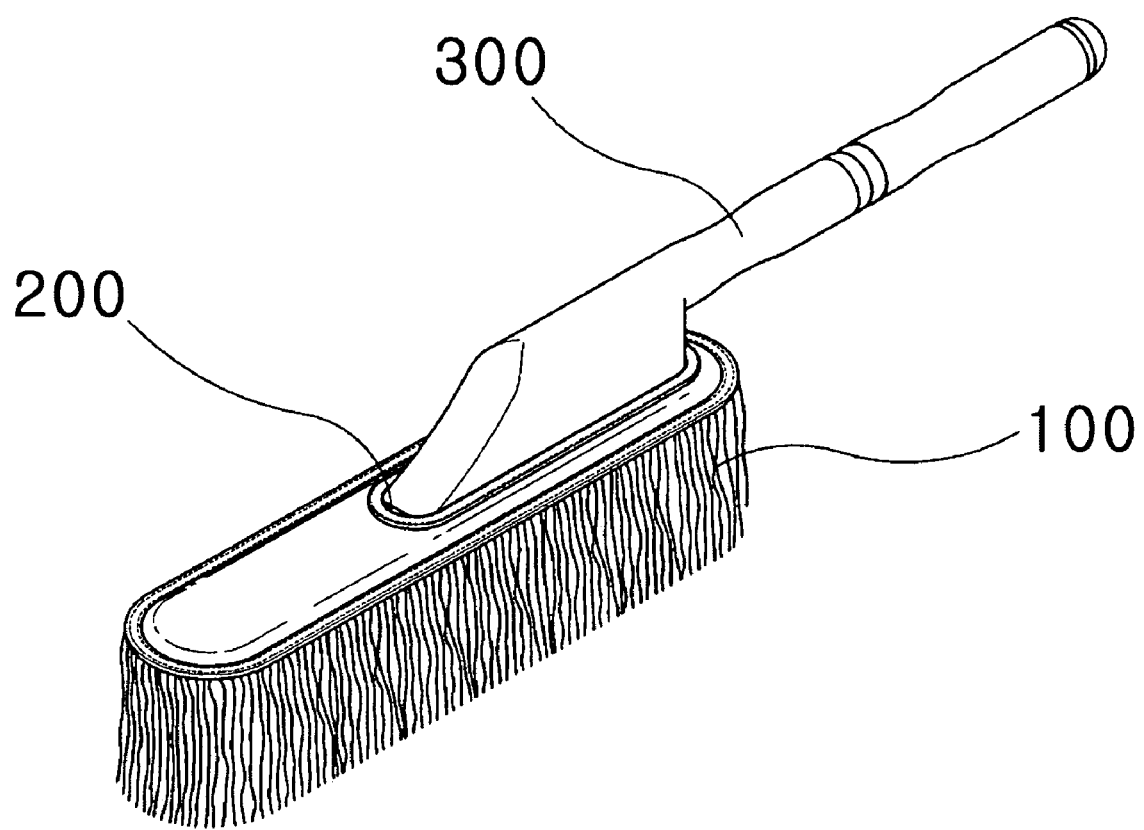
FIG. 7 is a perspective view showing a conventional duster.

From FIG. 6, it can be seen that the duster has a number of circular grooves 24 whose inner circumference has a spiral groove, which is formed at a lower part of the frame 20. A circular cap 241 has a spiral groove at its outer circumference so that it is screwed with the circular groove 24 and also has a grasp groove 241 at its one side. Circular magnetic sheets 42 are inserted into the circular grooves 24. The magnetic sheet 40 is divided in plural to form the circular magnetic sheets 42.

In the duster shown in FIG. 6, the circular magnetic sheets 42 are first received within the circular grooves 24 and the circular caps 241 are then screwed with the circular groove 24, so that the circular magnetic sheets 42 are safely seated into the circular grooves 24. Thus the user can adequately adjust the strength of magnetism, depending on conditions, by selectively inserting an adequate number of the circular magnetic sheets 42 into the circular grooves 24.

Furthermore, the circular grooves 24 and the circular caps 241 are screwed each other by means of the spiral. Such coupling is accomplished by the user who grasps the grasp groove 242 to turn the circular caps 241.

Therefore, according to the duster of the present invention, a user can selectively adjust the strength of magnetism by inserting or drawing out the circular magnetic sheets 42 into or from the circular grooves 24, depending on necessary strength of close adherence.

As described above, according to the present invention, a duster is closely adhered to the exterior of a vehicle by means of magnetism. There is an advantage that the duster is easy to use. It is also possible to finely clean all the portions of the vehicle including a high portion of the vehicle, semi-permanently maximize cleaning efficiency with a little force since there is not change in magnetism, and prevent in advance any damage due to miss of the duster during cleaning.

Further, according to the present invention, a magnetic sheet is insert-molded into a frame, thus making manufacturing easy and preventing any damage or breakage of the magnetic sheet. Therefore, there are advantages that it is possible to simplify the manufacturing process, reduce the cost for replacement and repair of the magnetic sheet and prevent in advance any damage of the magnetic sheet by carelessness.

In addition, according to the present invention, as magnetic sheets can be inserted into or drawn out from a frame, close adherence by magnetism is selectively adjusted by a user if necessary. Therefore, there are advantages that it is possible to adequately adjust the strength of magnetism depending on the amount of dust and increase convenience in use.

Furthermore, a user can adequately control magnetism by attaching and detaching magnetic sheets. It is thus possible to finely adjust the degree of close adherence depending on the amount of dust, significantly increase convenience in use and obtain much fine cleaning.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A duster for use in a vehicle comprising:
    a frame having a plurality of holes;
    a handle extending from one side of the frame;
    a sack-shaped dust cloth capable of being connected to the frame;
    a plurality of magnetic sheets, each having magnetism and each of which is capable of being inserted into each circular hole of the frame; and
    a plurality of caps, each of which is capable of securely covering the hole to contain the respective magnetic sheet inserted in each hole;
    wherein the frame is capable of being pulled to the exterior of the vehicle by means of magnetism to provide friction between the sack-shaped dust cloth connected to the frame and the exterior of the vehicle.

2. The duster as claimed in claim 1, wherein the holes are circular in shape and the inner surface of each of the holes is threaded, and wherein the caps are circular in shape and the outer portion of each of the circular caps is also threaded in order to allow the circular cap to be screwed in to the respective threaded circular hole, thereby securing containing the respective magnetic sheet inside the hole.

3. The duster as claimed in claim 1, wherein the frame and the handle are integrally formed of a synthetic resin material and the magnetic sheet is insert-molded into the frame.

* * * * *